Oct. 26, 1926.
L. A. HAMMARLUND
1,604,552
CONDENSER
Filed Jan. 10, 1925  2 Sheets-Sheet 1
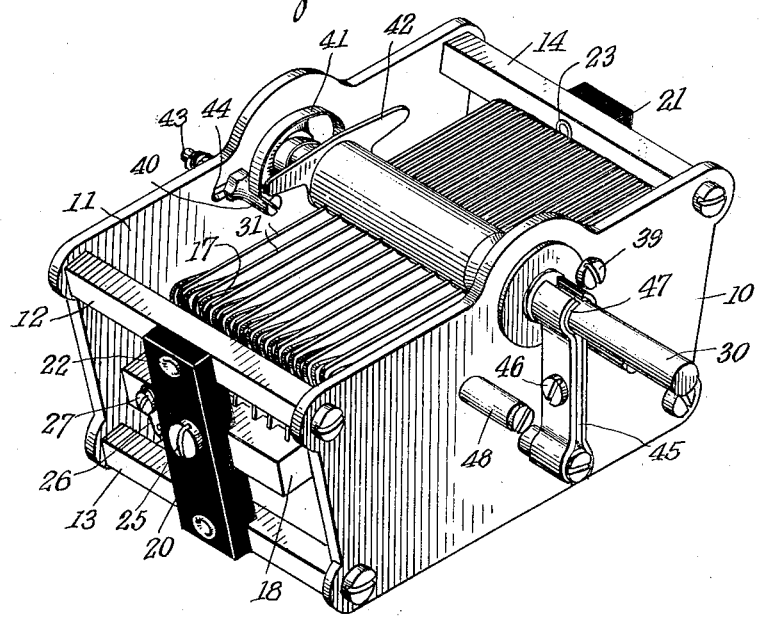
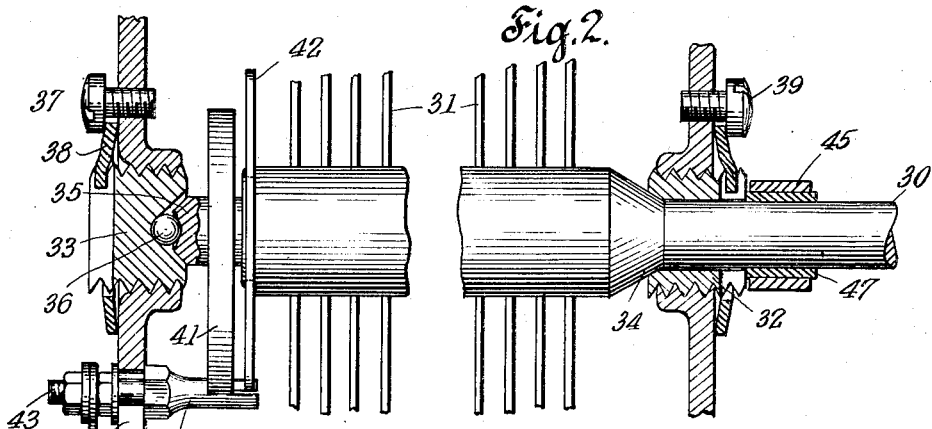
INVENTOR
Lloyd A. Hammarlund
BY
ATTORNEY Oct. 26, 1926.

L. A. HAMMARLUND

CONDENSER

Filed Jan. 10, 1925

INVENTOR
Lloyd A. Hammarlund
BY
ATTORNEY

Patented Oct. 26, 1926.

1,604,552

UNITED STATES PATENT OFFICE.

LLOYD A. HAMMARLUND, OF FLORAL PARK, NEW YORK, ASSIGNOR TO THE HAMMARLUND MANUFACTURING COMPANY, INCORPORATED, OF NEW YORK, N. Y., A CORPORATION OF NEW YORK.

CONDENSER.

Application filed January 10, 1925. Serial No. 1,515.

My invention relates particularly to a variable capacity device intended for use in so called radio receiving sets, and tuning circuits.

The main object is to provide a construction which is efficient and reliable. I have sought particularly to reduce leakage paths and losses to a minimum.

Another object is to construct and arrange the parts so that they can be readily made with accurately predetermined characteristics.

Another object is to provide a strong and rigid framework.

Another object is to facilitate adjustment of the bearings and yet prevent accidental disturbance.

Another object is to simplify the assembly and truing up of the parts and to ensure stable characteristics.

Fig. 1 is a perspective view of one form of condenser embodying my invention.

Fig. 2 is an enlarged fragmentary sectional view showing the construction and support of the rotor.

Fig. 3 is a fragmentary view showing the rear bearing for the rotor and the method of clamping it in position.

Figure 4:
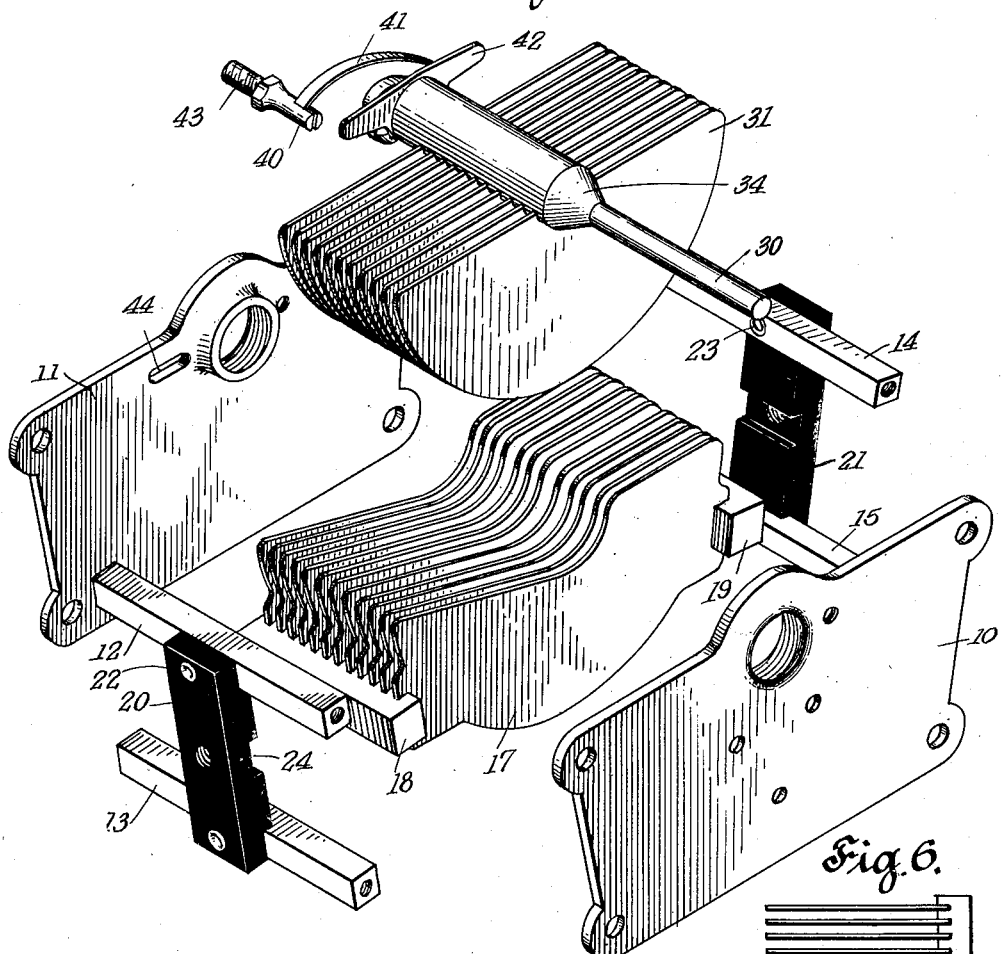
Fig. 4 is an "exploded" perspective view showing most of the principle parts of the device except the bearings.

The main frame of the condenser consists of the front plate 10, back plate 11, and the corner posts 12, 13, 14, and 15, held together by screws such as 16. The front and back plates and corner posts are preferably of aluminum.

The stator consists of a plurality of plates such as 17 of suitable design secured to end bars 18 and 19. These plates and bars are preferably of brass and the plates are soldered in slots in the bars. These bars 18 and 19 are in turn supported from the respective corner posts by insulating bars 20 and 21. The insulating bars may be conveniently secured to the corner posts by means of tubular rivets, such as 22 and 23. The insulating bars are preferably provided with channels such as 24 into which the end bars of the stator fit. A single screw 25 passes through the insulating bar 20 and into the end bar 18 to hold the bars together. The ends of the insulating bar 20 are preferably provided with channels to receive the corner posts 12 and 13. Electrical connection with either end bar of the stator may be effected by means of a soldering lug 26 and/or a binding screw 27.

The rotor consists of a shaft 30 and a series of plates 31 adapted to swing between the plates of the stator. The shaft of the rotor is supported in bearings 32 and 33 which screw into the front and rear plates 10 and 11, respectively. The rotor shaft is provided with a conical bearing surface 34 which fits in the rear of the bearing 32. At the rear the rotor shaft has a conical seat 35 for the ball 36 which is centered in the rear bearing 33. Each of these bearings 32 and 33 is adjustable for the purpose of accurately locating the rotor with respect to the stator and also for the purpose of taking up wear in the bearings. Each of the bearings is normally clamped in position by means of a screw 37 the head of which engages a flange 38 which extends from the periphery of the corresponding bearing. This flange is preferably provided by means of a separate washer which surrounds the outer end of the bearing and has a lug 39 which extends into one end of its screw-driver slot. By loosening the screw 37 the bearing 33 may be rotated to adjust it. The screw 37 is then tightened so as to clamp the flange of the washer to the supporting plate. A very slight movement of the screw 37 serves to loosen or tighten it. Furthermore the clamping of the screw 37 does not change the adjustment of the bearing. The front bearing 32 is clamped in a similar manner by a screw 39.

To the rear plate I secure a stud 40 which is connected to the rotor by a pigtail spring 41 so as to ground the rotor on the frame. The rear end of the rotor is provided with an extension or stop 42 adapted to engage the front end of the stud 40 so as to limit the rotation of the rotor when the parts are in their normal position. The stud 40, however, has a shank 43 which is horizontally adjustable in a slot 44 in the rear plate so that the stud may be released and moved out of the path of the stop 42 so as to permit the rotor to be freely revolved for the purpose of facilitating truing up of the plates after the rotor has been assembled in the frame with the stator.

Although the bearings are adjusted so as to support the rotor in proper relation to the stator, it is proper to provide additional frictional resistance so as to hold the rotor in any desired position. This may be effected in any suitable manner, as for instance, by means of clamping jaws 45 which are adjustable by a screw 46. These jaws grip the shaft of the rotor in a suitable manner so as to provide the requisite frictional grip. The lower ends of the jaws 45 engage a stop 47 to prevent them from rotating with respect to the rotor.

The entire frame may be suitably secured to a panel or other support, for instance, by means of posts and screws such as 48.

Figure 6:
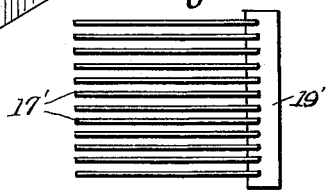
Fig. 6 is a plan view of a split stator.
Figure 5:
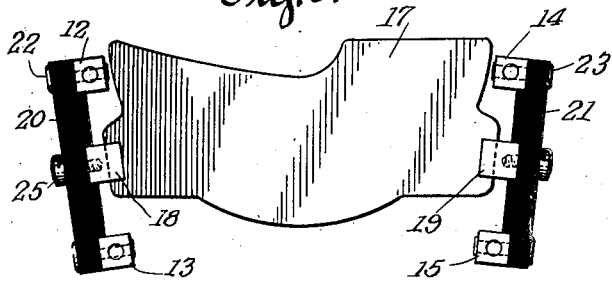
Fig. 5 is a front view of the stator frame construction.

In the construction heretofore described, the stator is supported at both ends. This stator might, however, be divided or split and have its opposite ends separately supported. For instance, Fig. 6 shows one-half of the stator in which the plates 17' are secured in the end bar 19' which would be mounted in a crossbar such as 21, as previously described. Obviously the stator and rotor might be divided into a number of parts so as to constitute a plurality of condensers.

In assembling the form shown in Figures 1 to 5, the stator plates are mounted in the end bars 18 and 19. Pairs of corner posts are secured to insulating crossbars, as shown in Fig. 4. Two posts together with their crossbar constitute an end unit. One of these units is then secured to each of the end bars 18 and 19 so as to constitute what may be termed the stator frame which can be conveniently handled. The rear plate 11 is then secured to the rear ends of the posts 12, 13, 14, and 15. The bearings 32 and 33 can, of course, be assembled and handled with the front and rear plates respectively. The rotor can conveniently be assembled in the bearing in the front plate. The ball-bearing 36 is then inserted in the rear plate and the rotor and front plate then secured in position. The bearings can then be adjusted so as to locate the rotor in its proper position with respect to the stator.

It will be noted that the insulating supports 20 and 21 are placed at points where the electrostatic field is at a minimum strength so that losses due to dielectric absorption are minimized.

The small size of the bars 20 and 21 also tends to keep the dielectric absorption loss very low. It will also be seen that the construction is such that the leakage paths from stator to rotor are narrow and quite long in order to keep the losses by surface leakage as low as possible commensurate with rugged mechanical construction.

While I have described all of the various features of my construction as contributing to the general desirability and efficiency of the device, it should be understood that many of the advantages of the complete construction may be secured by the use of various features even though not combined as herein shown and described. The claims of the patent are, therefore, not to be construed as limited to the precise construction herein shown except as they may be restricted by their terms. While the device is particularly constructed for use in radio work, it should be understood that the particular use to which the condenser is put is immaterial to the invention set forth.

I claim:

1. A condenser comprising front and rear plates, two pairs of metallic posts rigidly connecting said plates, a single insulating bar connecting the two posts of each pair, a single device at each end connecting said end to its supporting post, a stator having end bars connected to said insulating bars and a rotor supported in said front and rear plates and coacting with said stator.

2. A condenser comprising a front plate, two parallel supporting posts secured to one edge of said plate, an insulating cross bar, a single fastening device for securing each end of said cross bar to one of said posts, a series of stator plates, an end bar connecting said stator plates, a single fastening device securing said end bar to said cross bar and a rotor mounted in said front plate and cooperating with said stator plates.

3. A condenser comprising front and rear plates, a pair of metallic posts rigidly connecting said plates, a single insulating bar connecting said posts, a stator having an end bar and a single screw connecting said end bar to said insulating bar, and a rotor supported in said front and rear plates and coacting with said stator.

4. A condenser comprising front and rear plates, a pair of metallic posts rigidly connecting said plates, a single insulating bar connecting the mid points of said posts, a stator having an end bar whose mid point is connected to said insulating bar, and a rotor supported in said front and rear plates and co-acting with said stator.

5. A condenser comprising front and rear plates having screw threaded passages, a threaded bearing member adjustable in each passage, a rotor supported in said bearing members, a washer rotatably connected with each bearing member and means for clamping each washer to its coacting plate without affecting the pressure of the bearing member against the rotor.

6. In a condenser, a pair of metallic supporting posts, a connecting insulating bar and a single rivet connecting each end of said bar to one of said posts, and a stator mounted on said bar.

7. A condenser comprising a frame having front and rear plates, a stator supported by said frame, a rotor supported by said plates, at least one end of said rotor having a bearing member with a screw thread adjustable in one plate, a washer interlocked with said bearing member and rotatable therewith and a screw engaging one edge of said washer for clamping said bearing in place.

8. A condenser comprising a frame having front and rear plates, a stator rigidly supported by said frame, a rotor supported by said plates, said rotor having threaded bearing members adjustable in said plates, washers interlocked with said bearing members and rotatable therewith and screws engaging the edges of said washers for clamping said bearings in place.

9. A condenser comprising a frame having front and rear plates, a stator supported by said frame, a rotor supported by said plates, bearing members with screw threads adjustable in said plates, each bearing member having a flange rotatable therewith, and a screw engaging one edge of said flange for clamping its bearing in place.

10. A condenser comprising a frame having front and rear plates, a stator supported by said frame, a rotor supported by said plates, slotted bearing members with screw threads adjustable in said plates, a washer having a lug interlocked with the slot of each bearing member and rotatable therewith, and a screw engaging one edge of said washer for clamping its bearing in place.

11. A condenser comprising two pairs of metallic posts, insulating bars connecting the posts of each pair, a stator supported between said bars, a plate secured to said posts and having an adjustable bearing, a second plate secured to said posts and having an adjustable bearing, a rotor having a ball bearing in one of said bearings and having a shaft passing through the other bearing, and means for frictionally holding said shaft.

12. A condenser comprising two pairs of posts, insulating bars connecting the posts of each pair, a stator supported between said bars, a plate secured to said posts and having an adjustable bearing, a second plate secured to said posts and having an adjustable bearing, a rotor having a step in one of said bearings and having a shaft passing through the other bearing, and means for frictionally holding said shaft.

13. A condenser comprising a frame having front and rear plates, a stator and rotor mounted therein, a stop secured to one of said plates, said rotor having a projection adapted to engage said stop when said stop is in its path, said stop being movable out of the path of said rotor projection, and a spiral member electrically connecting said stop and said rotor.

14. A condenser comprising a frame having front and rear plates, a stator and rotor mounted therein, a stop secured to one of said plates, said rotor having a projection adapted to engage said stop when said stop is in its path, said stop being adjustable out of the path of said rotor projection, and a pig-tail spring electrically connecting said stop and said rotor.

15. A condenser comprising a frame, a series of stator and rotor plates mounted therein, a stop mounted in said frame, said rotor having a projection adapted to engage said stop when said stop is in its path, said stop being movable out of the path of said rotor projection to facilitate truing of said plates and an electrical connection between said rotor and said frame.

16. A condenser comprising a plate, a rotor having a bearing adjustably mounted in said plate, said plate having a slot extending away from said bearing, and an adjustable stop for said rotor mounted in said slot.

17. A condenser comprising a plate, a rotor having a bearing adjustably mounted in said plate, said plate having a slot extending away from said bearing, and an adjustable stop for said rotor mounted in said slot and connected to said rotor.

LLOYD A. HAMMARLUND.